Nov. 4, 1969  E. W. BROCK  3,476,975
HEAD LAMP LIGHTING CIRCUIT WITH A TIME DELAY SHUT OFF
AND A SWITCH POSITION WARNING INDICATOR
Filed May 16, 1967

INVENTOR.
Eugene W. Brock
BY
Robert E. Fowler
ATTORNEY

United States Patent Office 3,476,975
Patented Nov. 4, 1969

3,476,975
HEAD LAMP LIGHTING CIRCUIT WITH A TIME DELAY SHUT OFF AND A SWITCH POSITION WARNING INDICATOR
Eugene W. Brock, Anderson, Ind., assignor to General Motors Corporation, Detroit, Mich., a corporation of Delaware
Filed May 16, 1967, Ser. No. 638,807
Int. Cl. G60q 1/04
U.S. Cl. 315—83                                    4 Claims

ABSTRACT OF THE DISCLOSURE

Time delay means are provided for headlight systems on automotive vehicles to maintain the lights energized for a short period after the ignition has been turned off to permit the driver to leave the area while lighted with further means to indicate to the operator if he has neglected to move the headlight switch to "off" position so that the lights will be extinguished at the end of that period.

---

There have recently appeared on the market devices for providing a time delay period after the ignition switch of an automotive vehicle is opened to maintain an energizing circuit to the headlights so the same will remain illuminated at night and provide the operator with an opportunity to reach another area than that in which the car is parked. Prior art along this general line is Crum 2,751,507 and Herridge Jr. et al. 3,125,702. It is, of course, necessary to open the conventional light switch at the same time or prior to turning off the ignition switch so that the lights will go out after the predetermined time period, otherwise they will remain energized and run the battery down. Since the driver expects the lights to stay on for a while after he leaves the vehicle thus equipped, he is much more apt to walk away and leave the light switch in the "on" position than he would normally.

The present structure includes an audible or visible signal indicating means to call to the driver's attention that he has left the headlight switch on after the ignition switch is turned off.

Figure 1:
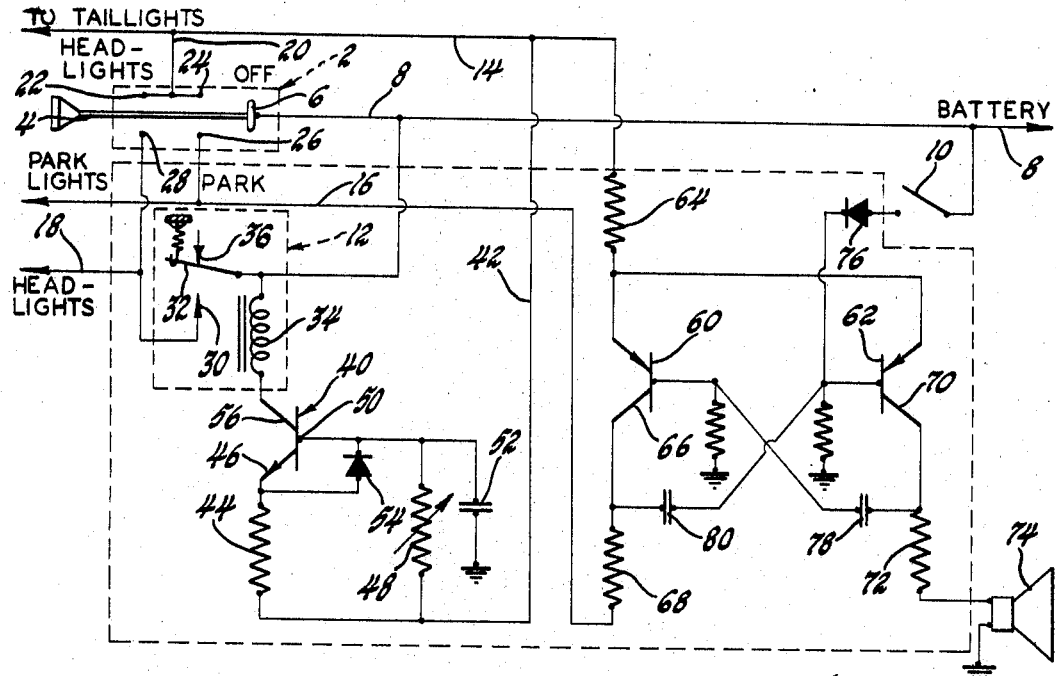
FIGURE 1 is a circuit diagram of the headlight system with combination time delay and warning embodying the invention.

As indicated, the time delay system per se forms no part of the present invention and has been previously disclosed in U.S. Patent No. 3,374,394. In FIGURE 1 the conventional headlamp switch 2 includes a transversely movable shaft 4 having a bridging conductive member 6 which is movable to three positions, "off," "park" and "on." A source of electrical power such as a battery is connected to power line 8. This line extends to the movable arm 10 of the ignition switch, directly to the conductive member 6 on shaft 4 and to the relay 12. The three conductive lines 14, 16 and 18 in the upper left hand corner of the figure are connected to the taillights, parking lights and headlights respectively as labeled.

Line 14 from the taillights is connected by tie line 20 to the upper spaced stationary contacts 22 and 24 in the headlight switch 2. Line 16 from the parking lights is connected to an inner lower stationary contact 26 opposite contact 24, the two being bridged by the member 6 when in switch "park" light position. Line 16 from the headlights is connected to outer lower contact 28 opposite contact 22, the two being bridged by the member 6 when the switch is pulled out to headlight "on" position. Line 18 is also connected to the lower contact 30 of the relay 12 which is engaged by the armature 32 when the relay coil 34 is energized. Otherwise the armature is spring biased upwardly into engagement with stop 36 which is unconnected. Both armature 32 and one end of coil 34 are connected to power line 8.

The delay circuit for maintaining the headlights energized for a short time period includes the transistor 40 and its associated connections. Line 14 from the taillights is connected through the line 42 and resistor 44 to emitter 46 of the transistor 40. Line 42 is also connected through variable resistor 48 to the base 50 of the transistor and to one side of a condenser 52, the opposite side of which is grounded. A diode 54 is connected between the base 50 and emitter 46 of the transistor 40. The collector 56 of the transistor is connected to the remaining terminal of the relay operating coil 34.

This portion of the system provides normal light operation from the conventional switch 2 with a time delay period after the ignition switch 10 is opened before the lights are turned off when the switch 2 is placed in the "off" position. It operates as follows. With the switch 2 in the "off" position no voltage is applied to the head lamps, tail lamps or parking lamps. Line 8 is at full line voltage, e.g. +12 volts, and line 42 is at ground through the filaments of the taillights. The emitter 46 and base 56 are essentially at ground so no current flows through the transistor 40 and capacitor 52 is not charged. By pulling the switch rod 4 out to "park" position, 12 volts is applied to the parking lights and taillights to energize the same and the emitter 46 and base 50 are raised to 12 volts. The transistor 40 still does not conduct under these conditions but the condenser 52 charges through resistor 44 which is of much lower value than variable resistor 48 and diode 54.

By now pulling the switch rod 4 out to "on" position the headlights and taillights are energized and the parking lights go off. The transistor 40 will still remain nonconductive since the emitter 46 will be at approximately the same potential as the collector 56. During this time the charging circuit for the condenser 52 will remain energized since the line 42 remains at full line voltage and relay 12 remains de-energized. The headlights of course are energized through a direct circuit from contact 6 to contact 28 in the main headlight switch.

If the vehicle is now parked and the ignition switch 10 opened and the headlight switch 2 turned off by moving rod 4 all the way to its inner or "off" position, line 42 now goes to ground potential through the filaments of the headlights or taillights and complete disengagement of movable contact 6 with any stationary contacts in the headlight switch 2. Since line 8 is still directly connected through relay coil 34 to the collector 56 of the transistor 40 to apply line voltage thereto and the emitter 46 is now dropped to approximately ground, the transistor may conduct energizing the relay coil and allowing it to pull its armature 32 downwardly into engagement with contact 30. This completes a bypass circuit from line 8 to the headlight circuit 18, and even though the main headlight energizing circuit is broken in the switch 2, the headlight filaments will remain energized as long as the armature 32 is maintained in its lower position against the tension of the biasing spring.

During this time period condenser 52 may discharge through resistor 48 since its opposite terminal is at approximately ground potential and, when it is discharged, the transistor 40 ceases to conduct de-energizing coil 34 and causing the relay to release its contact de-energizing the headlight filament. The time period of discharge of condenser 52 determines the length of time the headlight filaments will remain on after the switch 2 has been moved to "off" position and the ignition turned off. Since the resistance 48 is variable this time period may be adjusted as the operator desires. The diode 54 prevents the condenser from discharging through the path including the low resistance 44.

If the operator neglects to move the conventional head lamp switch 2 to its "off" position and leaves the car after merely shutting off the ignition switch and stopping the engine, the lights will, of course, remain energized and discharge the battery. Means are provided to warn the operator that this condition exists by the remainder of the system which includes the oscillator portion to the right in FIGURE 1. The oscillator circuit is a free running multivibrator which includes two transistors 60 and 62, the emitters of which are commonly connected together and through a resistance 64 to line 14 which extends to the taillight circuit of the vehicle. The collector 66 of transistor 60 is connected through a resistance 68 to line 16 to the parking light circuit and collector 70 of transistor 62 through resistor 72 is adapted to be connected to one terminal of the loud speaker 74 of the vehicle's radio system, the other side of which may be grounded. The ignition switch 10 is connected through a diode 76 to the base of transistor 62 to provide power for the multivibrator and the collectors 70 and 66 are cross connected to the bases of the alternate transistors through coupling condensers 78 and 80 in typical multivibrator manner.

It is clear from the described circuit that if the conventional lighting switch 2 is in "headlights on" position, that power is applied to the oscillator through line 14. It is, of course, applied to the same circuit simultaneously directly from power line 8 through the ignition switch 10, but under this condition the oscillator will not run. It is only when the ignition switch is open to unbalance the power input that the oscillator starts. Therefore, if the operator leaves the conventional light switch 2 in the "headlights on" position after opening the ignition switch 10, power is applied to the oscillator through line 14 only and it will start to oscillate and it does so in the audible frequency range.

The output of this oscillator is applied through coupling resistance 72 to the loud speaker 74 and an audible tone is emitted to warn the operator that he has failed to open the light switch and that he should do so, so that after the delay portion of the circuit previously described times out, the lights will go out. If it were not for this warning system or some similar system, the lights would be left on causing the battery to become discharged.

The warning to the driver that the conventional headlight switch has been left in an improper position can, of course, take other forms than that of an oscillator or an audible signal. The voltage present on such lines as line 14 may be utilized to operate a relay switch which in turn could operate almost any desired visual or other audible indicating means to call the driver's attention to this fact.

Figure 2:
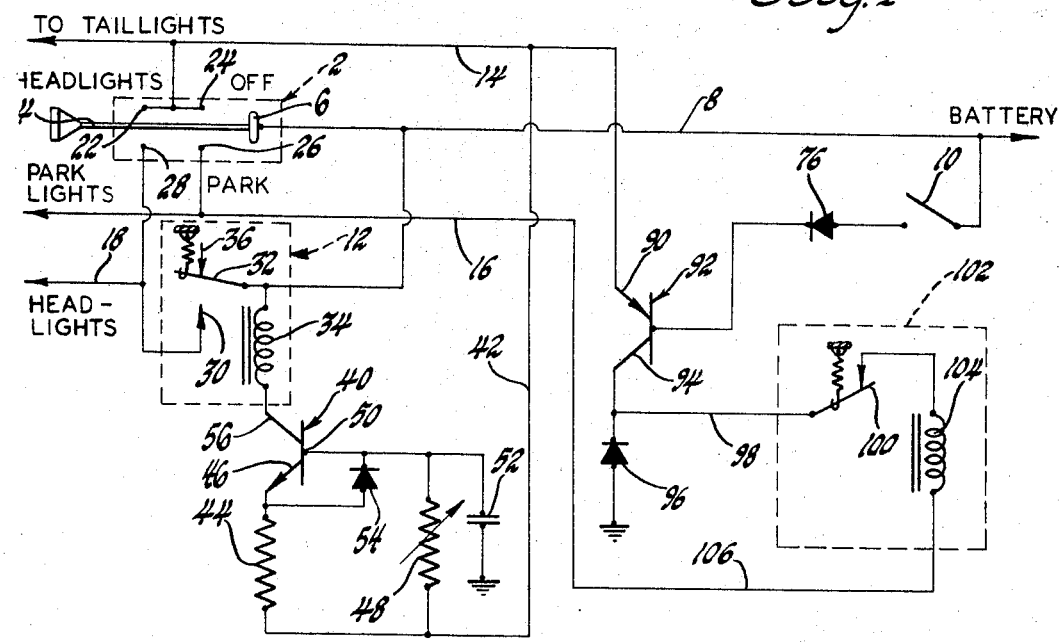
FIGURE 2 is a circuit diagram of a modified form of the invention.

FIGURE 2 illustrates a modified form of such a circuit. In that figure the left hand portion discloses exactly the same circuitry of the conventional headlight switch together with the delay portion for maintaining the headlights energized for a predetermined time after opening of the ignition switch and like reference characters are applied thereto.

In place of the oscillator, however, line 14 is shown connected directly to emitter 90 of a control transistor 92. The collector 94 of this transistor is connected to ground through a blocking diode 96 and tie line 98 connects the collector 94 with the armature 100 of buzzer 102 which is spring biased to close position. The operating coil 104 of the buzzer in series with the armature tends to pull the armature away from a stationary contact but when it has broken the circuit the spring tends to return it into engagement with the stationary contact to again complete the energizing circuit. This causes a buzzing sound as long as currrent flows in the circuit. The opposite side of the coil 104 is connected through line 106 with the parking light circuit 16 or a ground. Thus, if the lights are left in "headlights on" position and the ignition switch 10 opened, an energizing circuit will be completed from line 14 through the transistor 92 and buzzer to ground through the parking light circuit 16 to cause the buzzer to sound indicating that the switch should be moved to an inactive position.

The warning system could, of course, take other forms than a buzzer. Any other device operably by relay action could be used.

I claim:

1. In an engine powered vehicle having a control switch for the engine operation; operating lights for the vehicle; a manually operable switch for turning the operating lights on and off; a source of electrical power; time delay means including switching means operative when energized to connect the source of electrical power to the operating lights and capacitor means connected to the manually operable switch and the switching means so as to be charged by the source of electrical power when the manually operable switch is in the on position and so as to be discharged when the manually operable switch is thereafter moved to the off position and thereby cause the switching means to be energized to maintain the operating lights energized for a time period after the control switch for the engine operation has been opened to stop the engine; and warning means connected to the control switch for the engine operation and the operating light system so as to be energized if the control switch for the engine operation is opened to stop the engine but the manually operable switch for turning the lights on and off is not moved to its off position.

2. In an internal combustion engine powered vehicle having an ignition switch; operating lights for the vehicle; an ignition switch for controlling the engine operation; a manually operable switch for turning the operating lights on and off and a source of electrical power; time delay means including switching means operative when energized to connect the source of electrical power to the operating lights and capacitor means connected to the manually operable switch and the switching means so as to be charged by the source of electrical power when the manually operable switch is in the on position and so as to be discharged when the manually operable switch is thereafter moved to the off position and thereby cause the switching means to be energized to maintain the operating lights energized for a time period after the ignition switch has been opened to stop the engine; and warning means including oscillator means for producing audio frequency oscillations connectible by the ignition switch and by the manually operable light switch to the electrical source of power and arranged to be biased on to generate a warning signal when the manually operable light switch is not moved to off position after the ignition switch is opened.

3. In an engine powered vehicle having a control switch; operating lights for the vehicle; a manually operable switch for turning the operating lights on and off and a source of electrical power; time delay means including a relay connecting, when energized, the source of electrical power to the operating lights, a relay controlling switch operative to connect the relay to the source of electrical power, and capacitor means connected to the manually operable switch and the relay controlling switch so as to be charged by the electrical source of power when the manually operable switch is in the on position and so as to be discharged when the manually operable switch is thereafter moved to the off position and thereby render the relay controlling switch operative to cause the relay to be energized to maintain the operating lights energized for a time period after the control switch has been opened to stop the engine; and audible warning means connected to said ignition switch and the manual light switch and energized to produce a warning signal when the control switch is off and the manual light switch is on.

4. In an internal combustion engine powered vehicle having an ignition switch; operating lights for the vehicle; an ignition switch for controlling the engine operation; a manually operable switch for turning the operating lights on and off; a source of electrical power; time delay means including a relay connecting, when energized, the source of electrical power to the operating lights, a transistor switch operative to connect the relay to the source of electrical power, and capacitor means connected to the manually operable switch and the transistor switch so as to be charged by the electrical source of power when the manually operable switch is in the on position and so as to be discharged when the manually operable switch is thereafter moved to the off position and thereby render the transistor switch operative to cause the relay to be energized to maintain the operating lights energized for a time period after the ignition switch has been opened to stop the engine; and warning means including a free running oscillator having a plurality of transistors arranged to be nonconductive when connected both by the ignition switch and by the manually operable switch for the lights to the electrical power source and alternately conductive when the ignition switch is opened and the manually operable switch for the lights is in the on position; and audible sound producing means connected to the oscillator so that if the ignition switch is opened but the manually operable switch for the lights is not moved to the off position the oscillator will be energized to produce a warning sound for the driver.

References Cited

UNITED STATES PATENTS

| | | |
|---|---|---|
| 3,137,846 | 6/1964 | Keeling. |
| 3,225,250 | 12/1965 | Hershberger _____ 315—80 X |
| 3,256,461 | 6/1966 | Foreman et al. ____ 315—82 X |
| 3,264,626 | 8/1966 | Mounce _____ 331—113 X |
| 3,283,299 | 11/1966 | Savino _____ 315—82 X |
| 3,374,394 | 3/1968 | Miller _____ 315—82 |
| 3,388,288 | 6/1968 | Kibler _____ 315—82 X |

JAMES W. LAWRENCE, Primary Examiner

C. R. CAMPBELL, Assistant Examiner

U.S. Cl. X.R.

340—75; 315—80, 82